Oct. 25, 1949.
M. K. RICHARDS
2,486,207
LIQUID LEVEL MEASURING APPARATUS
Filed Aug. 11, 1945
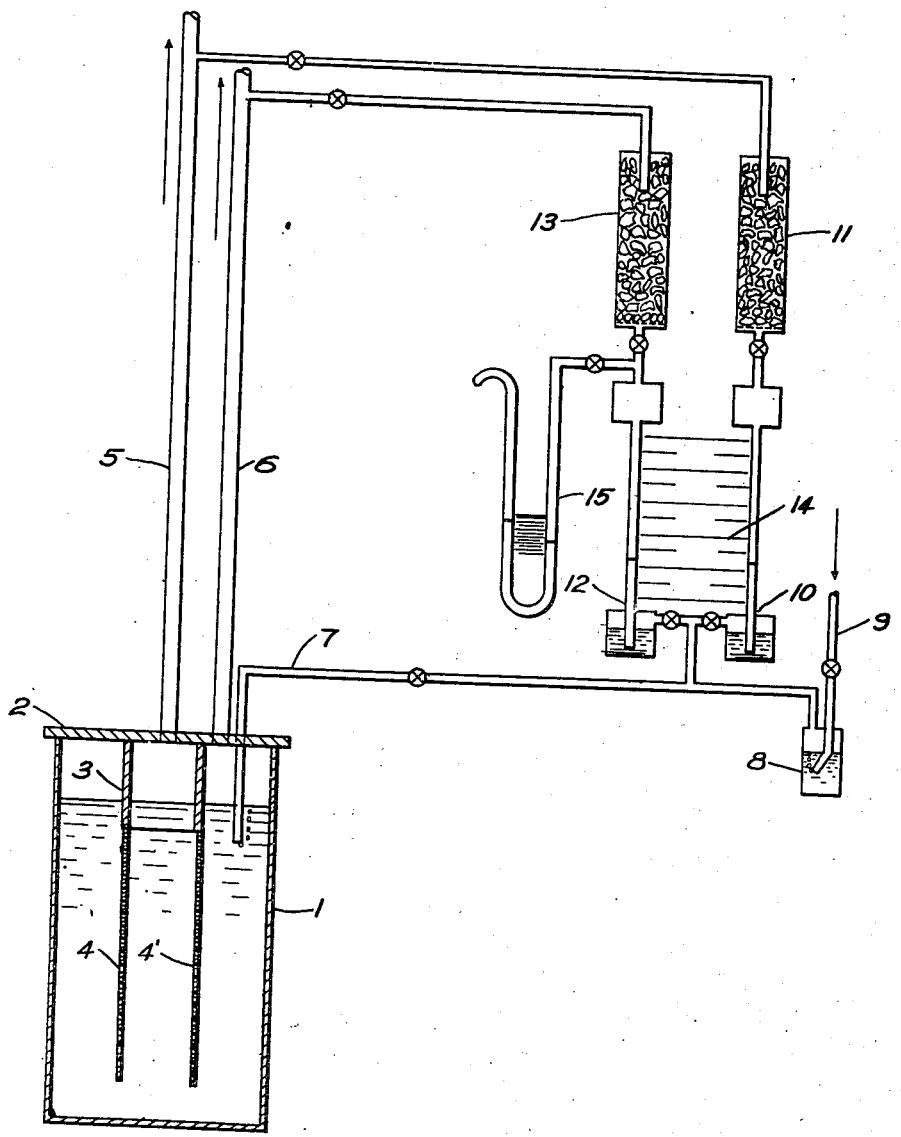
Inventor
Melbourne K. Richards
By Robert A. Tounender
Attorney Patented Oct. 25, 1949

2,486,207

UNITED STATES PATENT OFFICE 2,486,207

LIQUID LEVEL MEASURING APPARATUS

Melbourne K. Richards, Wilmington, Del., assignor to the United States of America as represented by the United States Atomic Energy Commission Application August 11, 1945, Serial No. 610,349

2 Claims. (Cl. 73—302)

This invention relates to the measurement of liquid levels in closed containers and is particularly concerned with the measurement of liquid levels in a container having two or more gas compartments above the same body of liquid.

The invention is of particular importance in the electrolytic generation of fluorine by the electrolysis of anhydrous acid potassium fluoride electrolytes. Cells for the production of fluorine normally comprise an anode compartment and a cathode compartment for the separate collection of fluorine and hydrogen generated by the electrolysis. It is obviously desirable to know the liquid levels in the compartments of such fluorine cells in order to regulate the addition of electrolyte. Moreover, it is important that the pressures in the two compartments be controlled to prevent excessive rise or fall of the liquid level in either compartment. An excessive rise in the liquid level may result in carry over of the electrolyte into subsequent gas treatment apparatus, whereas too great a drop in the level may permit gas to pass from one compartment to the other with a resultant introduction of fluorine. While such contamination is undesirable in any event, there is a possibility of introducing sufficient of the contaminating gas to produce an explosive mixture with the hazardous consequences which may result from the unsuspected handling of such mixtures. Because of the corrosiveness of the chemicals involved, materials permitting direct observation of liquid levels cannot be employed and mechanical and electrical measuring instruments are apt to become inaccurate.

It is an object of the invention to provide a simple means for measuring liquid levels in vessels containing two gas compartments above the same body of liquid. A further object is to accomplish this measurement by a gas bubbler of simple structure. A further object is to provide a liquid level measurement apparatus suitable for application in systems involving highly corrosive materials such as the fluorine, hydrogen fluoride, and acid potassium fluoride electrolyte involved in the electrolytic production of fluorine. Still further objects will appear from the following detailed description of the invention.

In accordance with the invention the gas compartments in which liquid levels are to be measured are connected to manometers which are in turn connected to a gas feed to the body of liquid beneath the compartments. The manometers thus measure the difference in pressure between the gas spaces and the gas feed. Since the same liquid body is beneath both gas spaces, the liquid level in each space corresponds to the gas pressure and the difference between the pressure of the gas feed and that of each of the gas spaces constitutes a direct measure of the height of the liquid column from the gas feed to the liquid level in that particular compartment.

The gas feed may be made up of any suitable inert gas which is not objectionable in the final product. Thus one of the gases generated may be employed and introduced into the corresponding compartment of the generator. If a small degree of dilution is not objectionable, another inert gas, such as nitrogen, helium, or argon, may be used. The inert gas is introduced at a sufficiently low rate to provide no substantial pressure drop between the manomter connection and the outlet beneath the liquid in the container.

In the measurement of electrolyte levels in fluorine cells, the manometers may be provided with a liquid inert to elemental fluorine and hydrogen fluoride; for example, a high boiling fluorocarbon may be used. However the use of such relatively costly materials may be avoided by interposing between the manometer and the gas compartments an absorber for the removal of elemental fluorine. A most satisfactory type of absorbent is an alkali-metal chloride or an alkaline earth metal chloride such as sodium chloride or calcium chloride. Any fluorine passing into this absorbent reacts to form the corresponding metal fluoride and gaseous chlorine. The manometer liquid then may be any material not readily attacked by chlorine or hydrogen fluoride vapor at normal temperatures. Liquids such as tricresyl phosphate, pentachlorethane, or 1,2,4-trichlorobenzene containing du Pont Oil Red to improve visibility have served effectively. The use of an absorbent between the manometers and the gas spaces of the containing vessel has the further advantage that the lines connecting the absorbers and manometers will be free of fluorine, and by locating the absorbers close to the cell and the manometers a substantial distance away, danger to the operators, as a result of possible leakage of fluorine, is substantially reduced.

In the attached drawing one embodiment of the invention is illustrated diagrammatically as applied to a cell for the electrolytic generation of fluorine. The numeral 1 designates the container for electrolyte. This container is closed by a cover 2 from which a bell 3 depends to form a central fluorine space and an annular hydrogen space. Whether the container 1 is of cylindrical or rectangular cross-section is of no consequence as far as the present invention is concerned as the invention is equally applicable to both types of cell. Perforated partitions or diaphragms 4 and 4' suspended from the bell 3 divide the electrolyte chamber into anode and cathode compartments beneath the corresponding gas spaces. The space between the perforated diaphragms 4 and 4' constitutes the anode chamber and the spaces between these diaphragms and the walls of the container constitute the cathode chambers. Anode and cathode structures and other conventional items have been omitted from the drawing for the sake of simplicity since they form no part of the invention. The top 2 of the cell is provided with a fluorine off-take pipe 5 and a hydrogen off-take pipe 6. Leading into the cathode compartment is an inert gas conduit 7 having its outlet at any desired point below the minimum normal electrolyte level and connected with a flowmeter 8, illustrated as a simple visible bubble-counter fed by an inert gas supply line 9. Connected across off-take pipe 5 and gas conduit 7 is a manometer 10 which is protected by an absorber 11. Connected across hydrogen off-take 6 and conduit 7 is a second manometer 12, protected by an absorber 13. A scale 14 is provided for reading the manometers.

If desired, a differential pressure gauge 15 measuring the difference between line pressure and atmospheric pressure may be provided between manometer 12 and absorber 13 or, alternatively, between manometer 10 and absorber 11, or both, for indicating the pressures on lines 5 and 6 directly.

The measuring device illustrated may be calibrated as follows:

With electrolyte in the container at a known level above the outlet of conduit 7, and with gas off-takes 5 and 6 at atmospheric pressure, nitrogen or hydrogen is introduced at a low constant rate as indicated by the flowmeter 8. The pressure readings on manometers 10 and 12 are indicated on the scale 14. The electrolyte is then raised to approximately the maximum level to which it may rise during operation and a second reading on manometers 10 and 12 is taken and marked on the scale. Between these limits the height of the electrolyte will be proportional to the manometer scale reading and the scale can be graduated accordingly. An alternative method of calibration involves determining a single electrolyte level scale reading and computing other electrolyte level scale readings on the basis of the known densities of the electrolyte and the manometer liquid. When the electrolyte level is maintained by intermittent additions of hydrogen fluoride, a slight calibration error is introduced because of the change in density of the electrolyte. In most operations this error is not significant. If desired, it can be accounted for by a correcting factor based on the average level indicated by the manometers. In the practical application of the system this has never been necessary as sufficient accuracy for control purposes is secured without it.

When the apparatus has been calibrated, it is ready for operation. In order to determine any variation in the liquid levels in the anode and cathode compartments, it is merely necessary to note the difference between the readings of manometers 10 and 12. When manometer 12 gives a higher reading than manometer 10, it shows that the liquid level is higher in the cathode compartment by a corresponding amount.

While the apparatus has been described with particular reference to its application to electrolyte level measurement in a fluorine generator, it is to be understood that the invention is not intended to be so limited since it is applicable to any liquid level measurement in containers involving two or more gas compartments above a single body of liquid and that it is particularly advantageous in situations involving chemicals which preclude the efficient operation of ordinary indicating devices. It will be understood further that I intend to include variations and modifications of the invention and that the preceding example is illustrative only and in no wise to be construed as a limitation upon the invention, the scope of which is defined in the appended claims, wherein

I claim:

1. A liquid level measuring apparatus for an electrolytic fluorine cell comprising an anode compartment and a cathode compartment separated by a perforated partition and having separate fluorine and hydrogen collecting spaces, said apparatus comprising an inert gas inlet for introducing an inert gas into the cathode compartment substantially below the normal electrolyte level, a manometer connected across the inert gas inlet and the fluorine collecting space, a second manometer connected across the inert gas inlet and the hydrogen collecting space, said manometers containing a liquid inert to chlorine, and a pair of fluorine absorption tubes containing a chloride fluorine-absorbent, one of said absorption tubes being connected between each of said manometers and the respective collecting space.

2. A liquid level measuring apparatus for a fluid container having a plurality of gas spaces closed at the bottom by a single body of liquid, said apparatus comprising a gas inlet for introducing an inert gas into the body of liquid below one of said spaces substantially below the normal liquid level, and a separate manometer connected between the inert gas inlet and each of said spaces.

MELBOURNE K. RICHARDS.

REFERENCES CITED

The following references are of record in the file of this patent:

UNITED STATES PATENTS

| Number | Name | Date |
|---|---|---|
| 2,034,458 | Calcott et al. | Mar. 17, 1936 |
| 2,331,208 | Ludi | Oct. 5, 1943 |

FOREIGN PATENTS

| Number | Country | Date |
|---|---|---|
| 6,938 | Great Britain | 1911 |
| 103,875 | Australia | May 3, 1938 |
| 114,856 | Great Britain | Apr. 25, 1918 |